Dec. 9, 1924.
M. W. MIX
COMPOSITE WHEEL FILLER
Filed Jan. 9, 1920
1,518,269
2 Sheets-Sheet 2
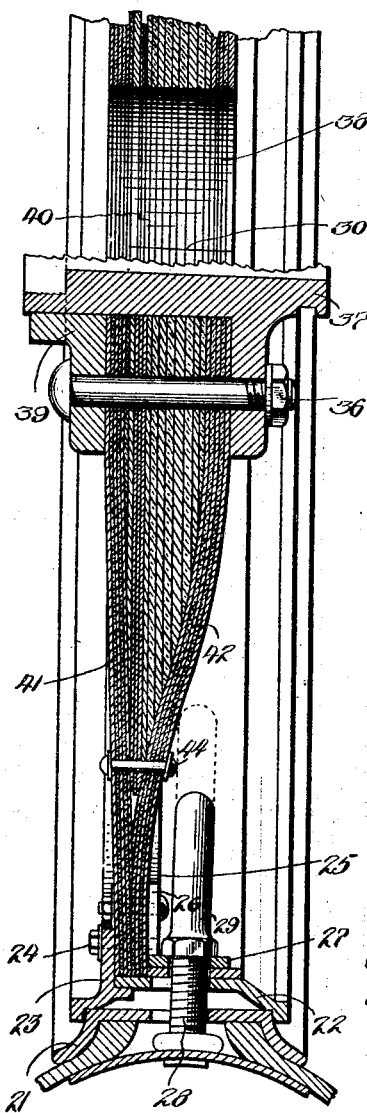
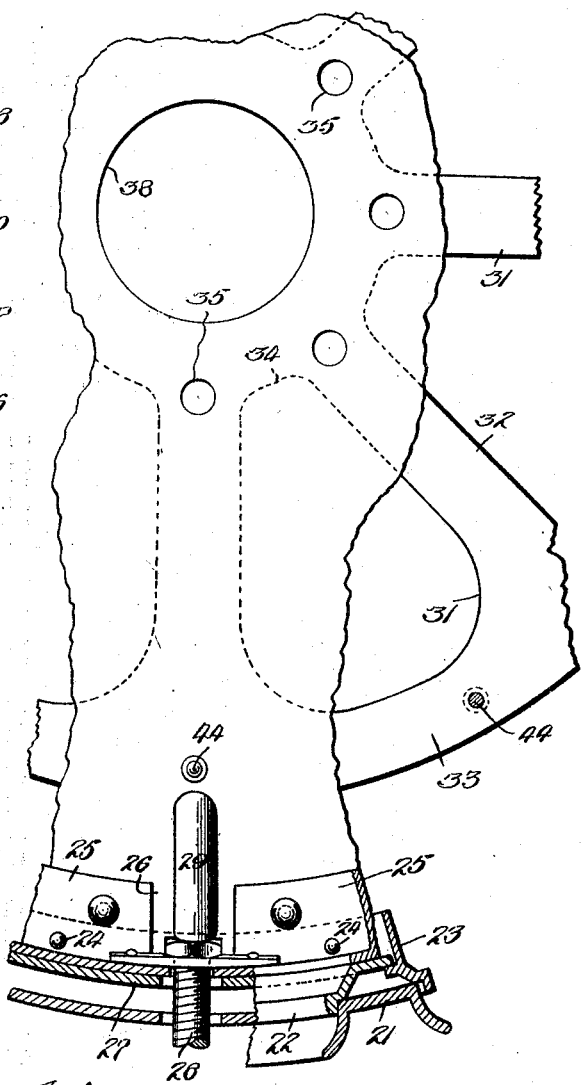
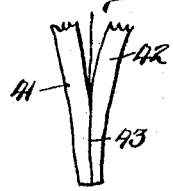
Melville W. Mix Inventor
By N. S. Amstutz
Attorney Patented Dec. 9, 1924.

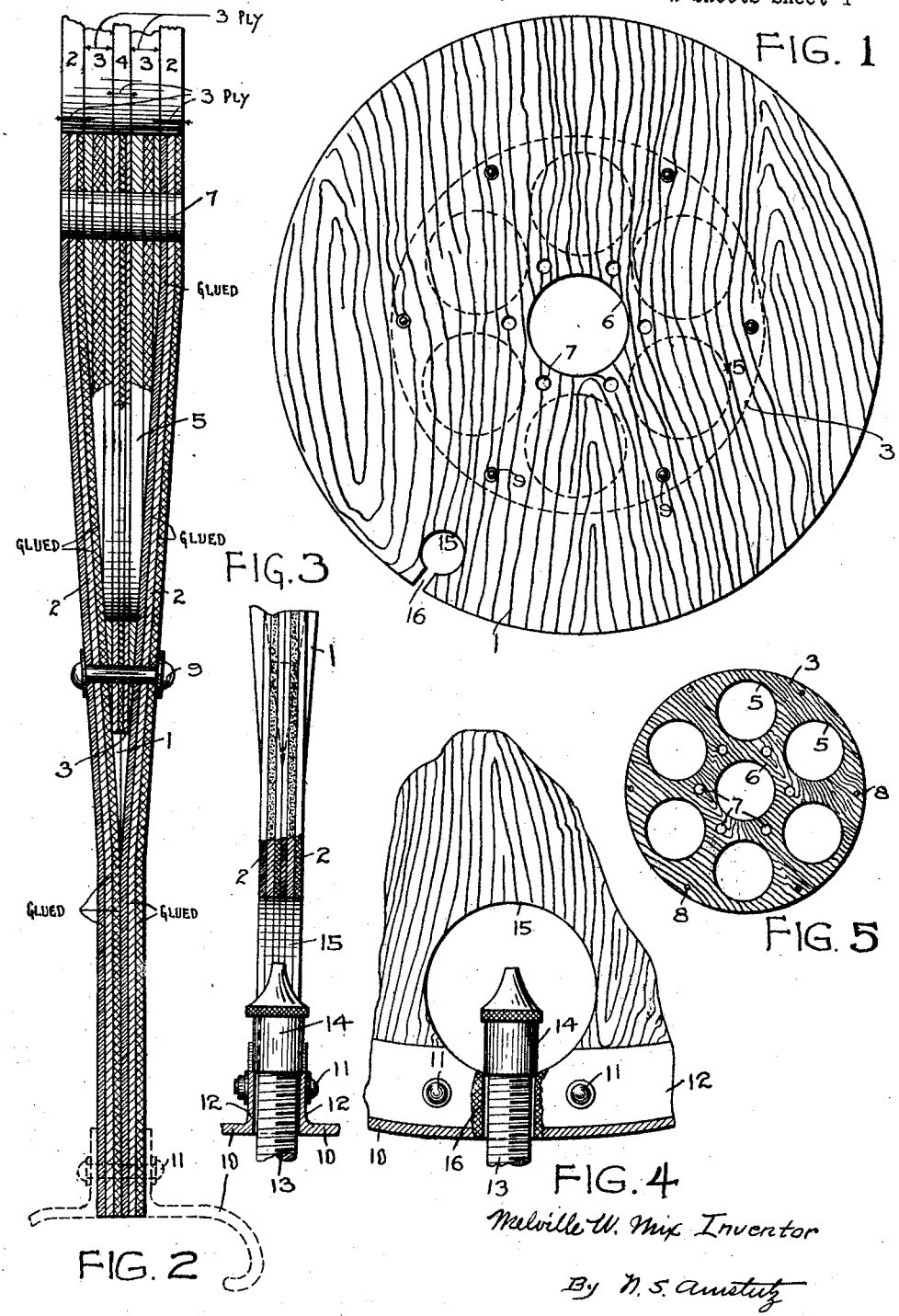

1,518,269

UNITED STATES PATENT OFFICE.

MELVILLE W. MIX, OF MISHAWAKA, INDIANA.

COMPOSITE WHEEL FILLER.

Application filed January 9, 1920. Serial No. 350,469.

*To all whom it may concern:*

Be it known that MELVILLE W. MIX, citizen of the United States, residing at Mishawaka, in the county of St. Joseph and State of Indiana, has invented certain new and useful Improvements in Composite Wheel Fillers, of which the following is a specification.

My invention relates to improvements in composite wheel fillers and it more especially appertains to the features hereinafter pointed out in the annexed claims.

The purpose of my invention is to produce a laminated wheel filler unit that is made up as a complete article of manufacture for use in connection with any desired style of rim or hub with which it may be combined thereafter; that has special strengthening features; that is not of excessive weight; and in which provision is made for the location of air valves when the filler unit is combined with pneumatic tires.

With these and other ends in view I illustrate in the accompanying drawings such instances of adaptation as will disclose the broad underlying features without limiting myself to the specific details shown.

Fig. 1 is a side elevation of a complete wheel filler unit ready to be assembled with whatever style of rim and hub may be desired.

Fig. 2 is an elevation in enlarged transverse section.

Fig. 3 is a fragmental edge elevation, partly in section showing an air valve opening formed near the outer periphery of the filler unit.

Fig. 4 is a side elevation of Fig. 3, both views being shown partly in section.

Fig. 5 is a fragmental side elevation of a complete laminated separator disk used as the interior of a completed wheel filler unit.

Fig. 6 is an enlarged cross section of one-half of a wheel.

Fig. 7 is a side elevation of Fig. 6 showing parts in section.

Fig. 8 is a fragmental diagrammatic view showing the outside wheel members beveled off where they meet at their periphery.

A complete article of manufacture as a wheel filler unit is designated by the numeral 1. This unit is composed of three main groups, the interior separator group 3 with its core 4 and the two outer groups 2. These groups may be formed of various ply-wood combinations, cemented to each other with waterproof cement. For instance group 2 may have a $\frac{1}{10}''$ core placed between two $\frac{1}{12}''$ surface layers; the groups 3 may be composed of a $\frac{1}{12}''$ center and two $\frac{1}{16}''$ outer layers; and the group 4 may have three plies of $\frac{1}{20}''$ each. These exemplifications are not given as a limitation in any sense whatever because the various exigencies of actual practice may demand almost unlimited variations in the detail arrangement of the assembled plies.

The separator disk 3 has openings 5 formed therein to reduce weight without reducing the strength of completed units. This is accomplished by leaving the material intact between the holes. A central hole 6 is provided in the separator group 3 and the other groups 2 for the insertion of a suitable wheel hub. Holes 7 serve for the insertion of bolts to hold a unit to its hub.

The completed unit is held together by cementing the contacting surfaces with waterproof glue and, in addition a series of rivets 9 are placed in holes 8. An opening 15 with a connecting slot 16 is formed near the periphery of a unit to accommodate the air valve cap 14 or air stem 13. The spreader unit 3 is beveled off on its sides as shown in Fig. 2 so as to give the completed units a trussed reinforcement which becomes an extra safeguard against heavy side strains.

It is to be understood that metallic sheaths may be used on the outside of groups 2 if desired for special kinds of service. Any kind of rim may be used, as instanced in Figs. 2 and 4 each half of rim 10 has a flange 12 which is placed against the sides of the unit at its periphery, where the two halves are held by bolts 11.

Whenever it is desired to make other provision for the air valves on pneumatic tired wheels and at the same time provide ample strength for side strains, etc., I may use the exemplification instanced on sheet 2, in Figs. 6, 7 and 8. In this adaptation the filler unit periphery comes to one side of the air valve position, as shown in Fig. 6. The wheel unit is also composed of the spreader or "filler" group 30 flanked inside by group 42 and on the outside by group 41. The inner group 30 has a core portion 40 composed of approximately 3 plies of uniform thickness and a plurality of thicker plies, a small number on the outside and a larger number on the inside.

This center group 30 is beveled slightly on the outside and curved in reverse form on the inside. Its component parts are caused to adhere to each other by means of waterproof cement and the entire group is also similarly cemented to the outer groups 41 and 42. In addition rivets 44 serve to further assist in holding the groups assembled as a complete article of manufacture entirely independent of the specific type of rim or hub with which a unit may be subsequently combined.

The outer group 41 and the curved inner group 42 for a short distance toward the center are beveled at 43 as shown in Fig. 8. To reduce weight the inner group 30 is cut away at 31 so as to form "spokes" 32 between adjacent openings 31 thus forming a rim portion 33 and a hub portion 34. Both inner and outer groups have holes 35 for bolts 36 for holding any desired type of hub 37 in assembled relation. The hub 37 has a follower flange 39 between which and the flange of the hub 37 a completed unit is clamped. These features are not specifically claimed herein but are made the subject of separate prosecution.

It is immaterial with what kind of tire rim a filler unit may be combined. In Figs. 6 and 7 a straight side demountable tire is instanced. A split rim 21 may be used, in connection with a metal fixed rim 22. An inner angle ring 25 may be secured to the fixed rim by spot welding or otherwise. Its radial flange is cut away at 26 to provide clearance for the dust cap 29, etc., but at this point it is reinforced by plate 27 through which the air stem 28 projects. The angle ring is bolted to the filler unit independently of the means employed to hold the tire and rim 21 in service position on an assembled wheel. As instanced in Fig. 6 this may comprise a bevel flanged ring 23 which is forced into place by bolts 24 that thread into the radial flange of the angle ring 25, thus forcing the split rim 21 apart to its proper amount and at the same time preventing the ingress of mud and dirt between the fixed rim 22 and the rim 21.

An important feature of my invention lies in the use of an interior spreader unit combined with exterior groups to form a completed article of manufacture.

What I claim is,

1. In wheel filler units, an interior unit comprising a plurality of laminæ, laminated exterior members enclosing said unit, and means for holding the parts assembled primarily as separate constituents and finally as a completed unit adapted to be subsequently used with any desired type of rim and hub.

2. In wheel filler units, an interior unit composed of a plurality of laminæ grouped in greater number near the center than at the periphery, separate and independent groups of laminæ adapted to enclose the interior unit in close contact, said groups being of larger diameter than the interior, and a waterproof cement for holding the various laminæ together and the groups of laminæ in assembled relation, and means adapted to assist in holding the exterior and interior parts assembled.

3. In wheel filler units, a laminated interior, thinner at its periphery than at its center, openings therethrough to reduce its weight leaving unremoved material between such openings to strengthen the same, inner and outer laminated coverings for the interior, and means for holding the parts in assembled relation.

4. In wheel filler units, a laminated interior comprising a group of thin layers of ply-wood forming a core therefor, thicker laminæ combined with said core and assembled therewith to form said interior unit, a plurality of grouped laminæ for enclosing the interior, and means for holding the parts assembled so that the periphery of the completed unit is found in a plane perpendicular to the axis of the wheel and substantially coincident with the center plane of the interior core.

5. In wheel filler units, groups of exterior laminæ diverging from each other from the periphery toward the center, an interior composed of a plurality of laminæ contacting with the exterior groups and means for holding the parts assembled.

6. In wheel filler units, groups of interior laminæ of increasing thickness from the periphery toward the center, exterior laminæ contacting with the interior on each face but of larger diameter and contacting with each other outside the diameter of the interior, said exterior laminæ having an opening joined to a slot leading thereto from the periphery of the exterior laminæ, the whole constituting an independent unit.

7. In wheel filler units, a laminated interior group of a given diameter thinner at its periphery than at its center and having a hub opening therethrough such laminæ being held together as a unit, exterior groups of laminæ of a larger diameter contacting with the interior, means for holding the latter groups in contact with each other and also in engagement with the interior group to constitute an independent unit.

8. An article of manufacture constituting a wheel filler unit composed of an interior spreader member of varying radial thickness combined with exterior laminar groups of approximately uniform thickness.

9. An article of manufacture comprising an interior laminar spreader unit combined with exterior groups of laminæ to constitute a wheel filler unit.

In testimony whereof I affix my signature.

MELVILLE W. MIX.